(12) United States Patent
Xu et al.

(10) Patent No.: US 9,477,146 B2
(45) Date of Patent: Oct. 25, 2016

(54) PROJECTION RING

(71) Applicant: BOE Technology Group Co., Ltd., Beijing (CN)

(72) Inventors: Qiushi Xu, Beijing (CN); Yanshun Chen, Beijing (CN); Yaohui Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/443,334

(22) PCT Filed: Apr. 21, 2015

(86) PCT No.: PCT/CN2015/077064
§ 371 (c)(1),
(2) Date: May 15, 2015

(87) PCT Pub. No.: WO2015/165343
PCT Pub. Date: Nov. 5, 2015

(65) Prior Publication Data
US 2015/0341606 A1    Nov. 26, 2015

(30) Foreign Application Priority Data

Apr. 28, 2014   (CN) .......................... 2014 2 0213546

(51) Int. Cl.
*G03B 21/30* (2006.01)
*H04N 9/31* (2006.01)
(Continued)

(52) U.S. Cl.
CPC ............... *G03B 21/30* (2013.01); *G03B 17/04* (2013.01); *G06F 3/0421* (2013.01); *G06F 3/04886* (2013.01); *H04N 9/00* (2013.01); *H04N 9/3173* (2013.01); *A44C 9/0053* (2013.01);
(Continued)

(58) Field of Classification Search
CPC ........ G06F 3/00; G06F 3/014; G06F 3/0421; G06F 3/04886; H04N 9/00; H04N 9/3173; A44C 9/0053; G03B 21/30; G03B 17/04
See application file for complete search history.

(56) References Cited

U.S. PATENT DOCUMENTS

| | | | | |
|---|---|---|---|---|
| 5,481,265 | A | * | 1/1996 | Russell ..................... A61F 4/00 101/486 |
| 2005/0028943 | A1 | * | 2/2005 | Chang ....................... E06B 9/42 160/23.1 |

(Continued)

FOREIGN PATENT DOCUMENTS

| | | |
|---|---|---|
| CN | 201032060 Y | 3/2008 |
| CN | 202233418 U | 5/2012 |

(Continued)

OTHER PUBLICATIONS

Jul. 17, 2015—International Search Report Appn PCT/CN2015/077064 with Eng Tran of Written Opinion.
(Continued)

*Primary Examiner* — Sultan Chowdhury
*Assistant Examiner* — Magda Cruz
(74) *Attorney, Agent, or Firm* — Banner & Witcoff, Ltd.

(57) ABSTRACT

Disclosed is a projection ring, including an annular body; a telescopic portion disposed on the annular body; and a projector disposed on the telescopic portion. The location of the projector on the projection ring is easily adjustable, thus it's convenient to adjust the size of the picture as projected or the projection angle.

14 Claims, 5 Drawing Sheets

(51) Int. Cl.
   *G06F 3/042*    (2006.01)
   *G06F 3/0488*   (2013.01)
   *G03B 17/04*    (2006.01)
   *H04N 9/00*     (2006.01)
   *A44C 9/00*     (2006.01)
   *G06F 3/01*     (2006.01)
   *G06F 3/00*     (2006.01)

(52) U.S. Cl.
   CPC ............... *G06F 3/00* (2013.01); *G06F 3/014* (2013.01); *G06F 2203/0331* (2013.01)

(56) References Cited

U.S. PATENT DOCUMENTS

2011/0007035 A1* 1/2011 Shai .................. G06F 3/014
                                              345/179

2012/0249409 A1* 10/2012 Toney .................. G06F 3/017
                                              345/156

FOREIGN PATENT DOCUMENTS

| | | |
|---|---|---|
| CN | 202907998 U | 5/2013 |
| CN | 203054342 U | 7/2013 |
| CN | 103546181 A | 1/2014 |
| CN | 203986449 U | 12/2014 |
| GB | 1514537 A | 6/1978 |
| JP | 2011164140 A | 8/2011 |
| KR | 1020100072198 A | 6/2010 |
| KR | 1020130115558 A | 10/2013 |

OTHER PUBLICATIONS

May 16, 2016 (KR)—First Office Action Appn 10-2015-7014139 with English Tran.

* cited by examiner

PROJECTION RING

The application is a U.S. National Phase Entry of International Application No. PCT/CN2015/077064 filed on Apr. 21, 2015, designating the United States of America and claiming priority to Chinese Patent Application No. 201420213546.0 filed on Apr. 28, 2014. The present application claims priority to and the benefit of the above-identified applications and the above-identified applications are incorporated by reference herein in their entirety.

TECHNICAL FILED

Embodiments of the present invention relate to a projection ring.

BACKGROUND

At present, scientific technology has become increasingly indispensable to people's normal lives in that smart phones, notebook computers and tablet computers have been widely used almost everywhere, thus scientific products are all developing with trend of both smaller size and intelligent system. A wearable scientific product refers to a wearable object incorporated with part of functions of conventional devices. Such wearable scientific product allows more closely bonding a human body with machines and releasing the human body to the largest extent. However, existing projection ring that incorporates a projector into a ring often has difficulty in adjusting projection location, and thus is not conveniently operable enough.

SUMMARY

Embodiments of the present invention provide a projection ring comprising an annular body; a telescopic portion disposed on the annular body; and a projector disposed on the telescopic portion.

In an example, a telescopic direction of the telescopic portion is a central axial direction of the annular body.

In an example, the projector is rotatably connected to the telescopic portion.

In an example, the telescopic portion is rotatably connected to the annular body.

In an example, the telescopic portion comprises a telescopic arm and a telescopic head, and the projector is disposed on the telescopic head which is hinged to the telescopic arm.

In an example, the telescopic portion comprises a plurality of thimbles which are movably nested one on top of another, wherein a first thimble is fixedly disposed on the annular body and a last thimble is provided with the projector thereon.

In an example, the telescopic portion comprises a roller, a roller box and a strip-shaped supporting belt. For example, the roller is disposed within the roller box; the roller box is provided with an opening thereon, and the supporting belt has one end fixedly connected to the roller and the other end provided with the projector thereon; in condition that the telescopic portion is in a draw-back state, the supporting belt is bent to wrap around the roller; in condition that the telescopic portion is in a stretch-out state, the end of the supporting belt that is provided with the projector is penetrating through the opening of the roller box to allow the supporting belt expanding into a straight bar.

In an example, the above-mentioned projection ring further comprises: a laser generator disposed on the annular body; and a laser sensor disposed on the annular body or on the telescopic portion. For example, the laser generator is an infrared ray generator, and the laser sensor is an infrared ray sensor.

In an example, the above-mentioned projection ring further comprises a signal processing device disposed on the annular body or on the telescopic portion, and the signal processing device is electrically connected to the laser sensor.

In an example, the above-mentioned projection ring further comprises a wireless module electrically connected to the projector.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Figure 1:
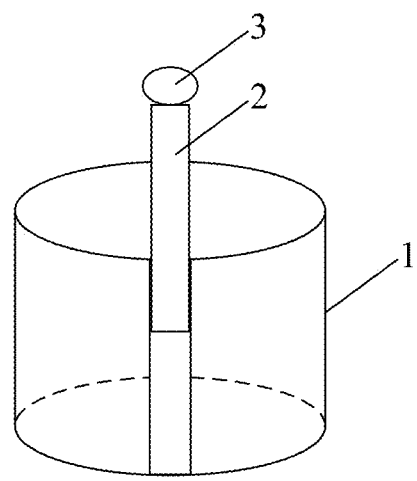
FIG. 1 is a structural view of a projection ring according to an embodiment of the present invention.

As illustrated in FIG. 1, an embodiment of the present invention provides a projection ring, comprising: an annular body 1; a telescopic portion 2 disposed on the annular body 1; and a projector 3 dispose on the telescopic portion 2.

Figure 2:
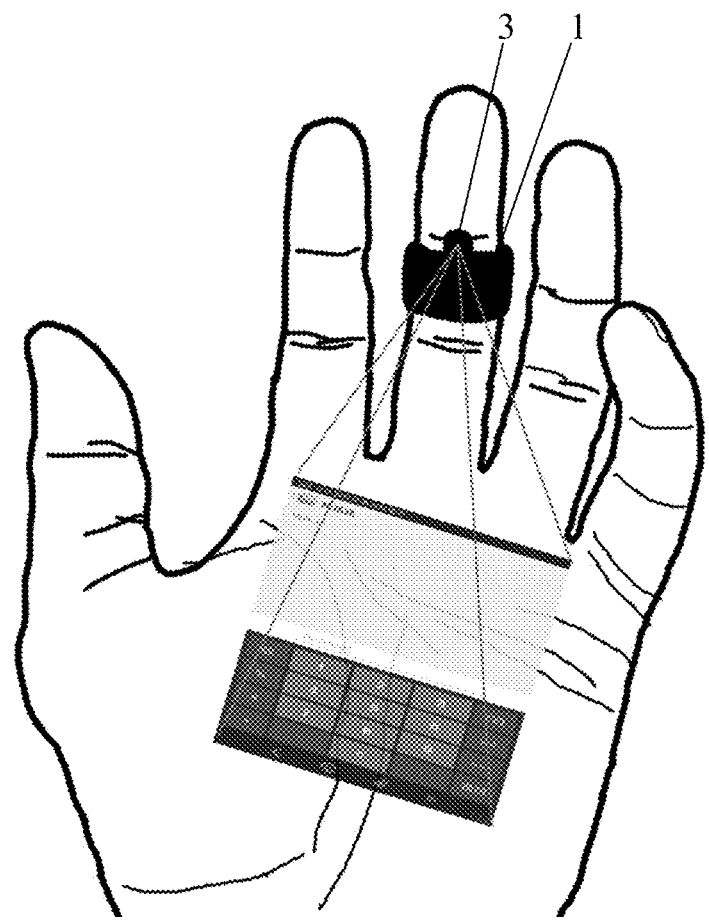
FIG. 2 is a schematic view of the projection ring in FIG. 1 when worn on a finger.

The projector 3 is configured to project a picture, and a size of the picture as projected or a projection angle is adjustable by adjusting a location of the projector 3 through the telescopic portion 2. For example, as illustrated in FIG. 1 and FIG. 2, the annular body 1 can be worn on a finger with the telescopic portion 2 being extendable towards the fingertip, so that the projector 3 is located closer to the fingertip to project an picture towards the palm which becomes a projection screen configured to display the picture projected by the projector 3. The location of the projector 3 is adjustable to be closer to the fingertip through the telescopic portion 2 so as to increase a display area for projection on the palm. Of course, the projector 3 may also be disposed towards the hand back so as to project a picture onto a desktop or a screen in front of the wearer, and the size of the picture as projected or the projection angle is still be adjusted by adjusting the location of the projector 3. For example, the wearer may put his/her hand wearing the projection ring on a table in such a manner that the palm is facing towards the table and is keeping clenched or half-clenched, with the projector 3 facing towards a desktop or a screen in front of the wearer; in this way, it only requires controlling the telescopic portion to stretch out towards the finger root to increase the display area for projection on the desktop or the screen, without the need of moving the arm or the finger of the wearer.

The projection ring according to the present embodiment allows conveniently adjusting the size of the picture as projected or the projection angle so as to improve display effect, by adjusting the location of the projector through arranging a telescopic portion. Furthermore, it has no need of changing the location of the projection ring worn on the finger and thus ensures the wearing comfort level.

In an example, the projector 3 is rotatably connected to the telescopic portion 2 so as to further adjust the projection angle through the rotatable projector.

In an example, the telescopic portion 2 is rotatably connected to the annular body 1 so as to further adjust the projection angle through the rotatable telescopic portion 2.

Figure 3:
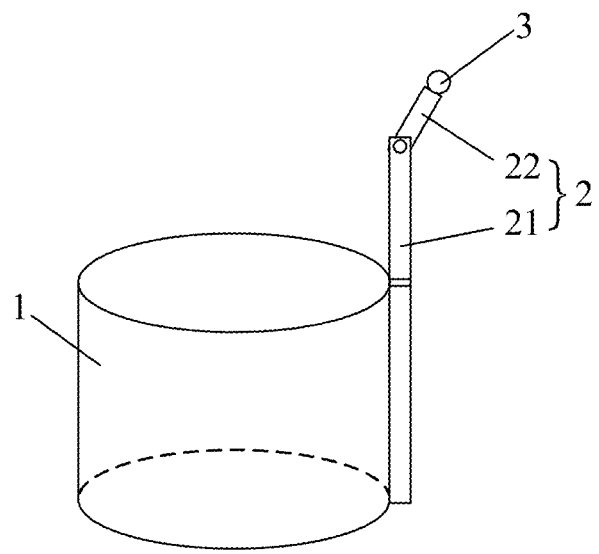
FIG. 3 is a structural view of another projection ring according to an embodiment of the present invention.

In an example, as illustrated in FIG. 3, the telescopic portion 2 comprises a telescopic arm 21 and a telescopic head 22; the projector 3 is disposed on the telescopic head 22 which is hinged to the telescopic arm 21 so as to further adjust the projection angle by bending the telescopic head 22 of the telescopic portion 2 with respective to the telescopic arm 21 of the telescopic portion 2.

In an example, as illustrated in FIG. 1, the telescopic portion 2 is stretching out or drawing back along a central axial direction of the annular body 1 so as to facilitate adjusting the location of the projector 3 in the finger direction.

Figure 4:
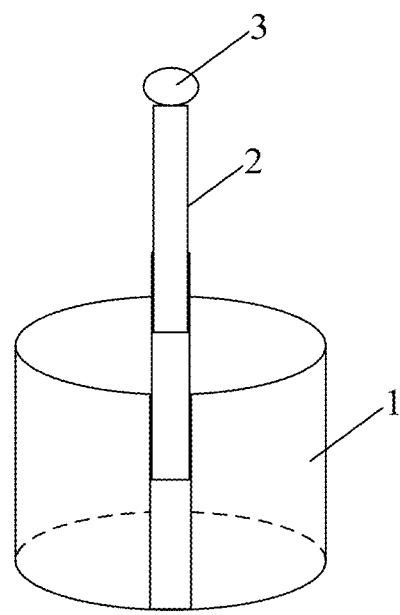
FIG. 4 is a structural view of a projection ring provided with a telescopic portion comprising a plurality of thimbles, according to an embodiment of the present invention.
Figure 5:
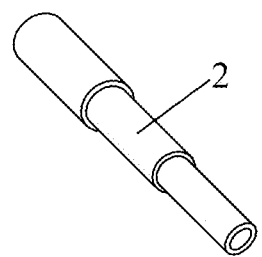
FIG. 5 is a structural view of the telescopic portion in FIG. 4 in a stretch-out state.
Figure 6:
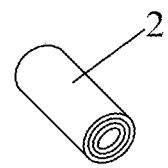
FIG. 6 is a structural view of the telescopic portion in FIG. 4 in a draw-back state.

In an example, as illustrated in FIG. 4 and FIG. 5, the telescopic portion 2 comprises a plurality of thimbles which are movably nested one on top of another, wherein the first thimble is fixedly disposed on the annular body 1 and the last thimble is provided with the projector 3 thereon. As illustrated in FIG. 6, when the projector 3 is not in operation, the plurality of thimbles may be compressed to place the telescopic portion 2 in a draw-back state in which all of the thimbles are nested one another in a manner of overlapping the location of the first thimble; in this way, a length of the telescopic portion 2 is constituted by only one thimble, which reduces the space occupied by the telescopic portion 2 and thus ensures the comfort and aesthetic level of the projection ring worn on the finger. As illustrated in FIG. 5, when the projector 3 is in operation, the plurality of thimbles may be stretched to place the telescopic portion 2 in a stretch-out state, which allows a maximum length of the telescopic portion 2 to reach a sum of lengths of all the thimbles; that is, for adjacent two thimbles, only a tail end of a former thimble is connected to a front end of a following thimble. The location of the projector 3 is adjustable by pushing or pulling the thimbles.

Figure 7:
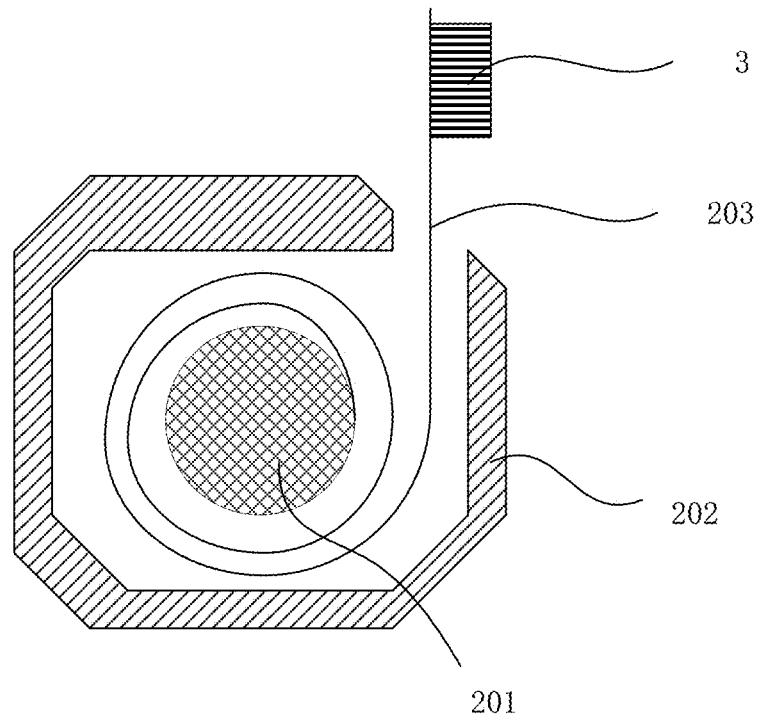
FIG. 7 is a structural view of another telescopic portion according to an embodiment of the present invention.
Figure 8:
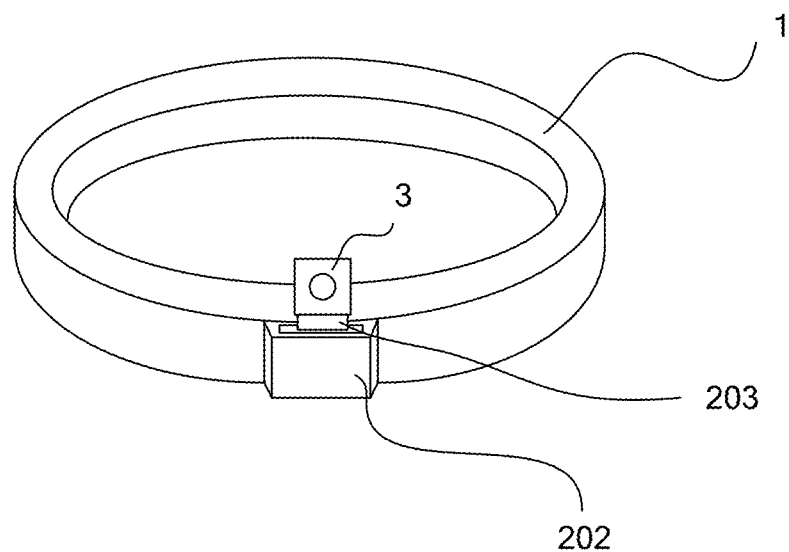
FIG. 8 is a structural view of the telescopic portion in FIG. 7 in a draw-back state.
Figure 9:
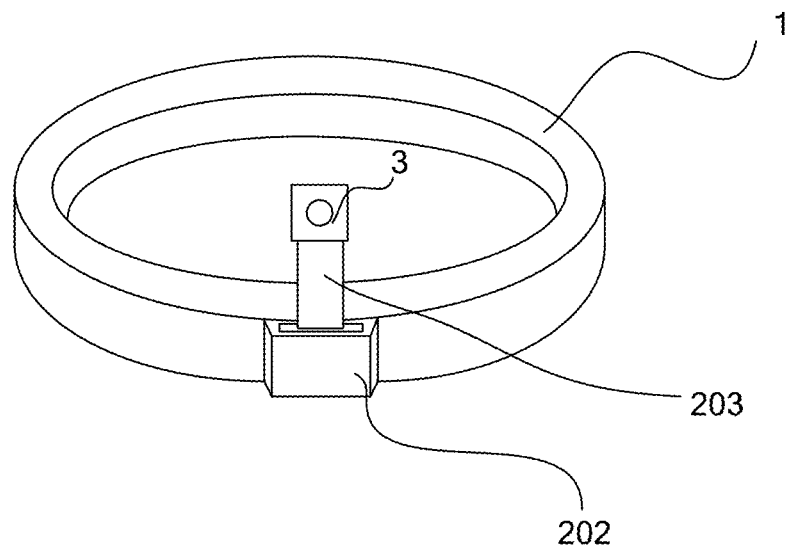
FIG. 9 is a structural view of the telescopic portion in FIG. 7 in a stretch-out state.

The above-mentioned telescopic portion can also realize stretching out and drawing back by ways other than a plurality of thimbles. In an example, as illustrated in FIG. 7, the telescopic portion 2' comprises a roller 201, a roller box 202 and a strip-shaped supporting belt 203; the roller 201 is disposed within the roller box 202; the roller box 202 is provided with an opening thereon; the supporting belt 201 possesses a certain flexibility and hardness, and has one end fixedly connected to the roller 201 and the other end provided with the projector 3 thereon. When the telescopic portion 2' is placed in a draw-back state, the supporting belt 203 is bent to wrap around the roller 201, as illustrated in FIG. 8; when the telescopic portion 2' is placed in a stretch-out state, the end of the supporting belt 203 that is provided with the projector 3 is penetrating through the opening of the roller box 202 to allow the supporting belt 203 extending as a straight bar, as illustrated in FIG. 9. The above-mentioned telescopic portion 2' comprising the roller 201, the roller box 202 and the strip-shaped supporting belt 203 is in a form of measuring tape, so it can adjust the location of the projector 3 through pushing or pulling the supporting belt 203. Moreover, it can also achieve stretching out and drawing back the telescopic portion by controlling a lead screw driven through an electric motor. In addition, an action of stretching out/drawing back the telescopic portion can also directly turn on/off the projector other than adjusting the location of the projector.

Figure 10:
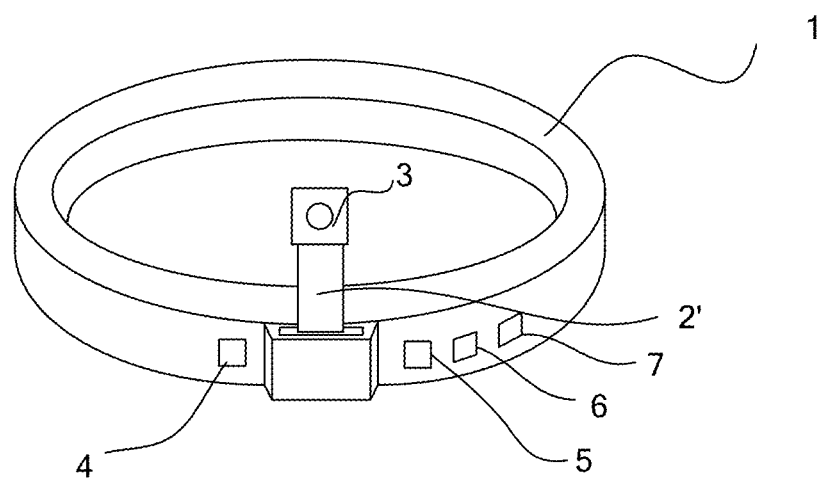
FIG. 10 is a structural view of yet another projection ring according to an embodiment of the present invention.

In an example, the above-mentioned projection ring further comprises a laser generator 3 disposed on the annular body 1; and a laser sensor 5 disposed on the annular body 1 or the telescopic portion 2 (or 2'), as illustrated in FIG. 10. The above-mentioned projector 3, laser generator 4 and laser sensor 5, together, constitute a projection-sensor device of virtual keyboard. For example, the projector 3 projects a picture of keyboard onto a palm and the laser generator 4 generates a laser parallel to a surface of the palm, for example, an infrared ray; in this way, when a finger presses a key in the picture of keyboard on the palm, the laser generates a light spot on the finger, and the laser sensor 5 detects a location of the light spot on the finger to determine which key is pressed according to a mapping relation between a location of the light spot and the picture of keyboard, so as to achieve projecting and sensing the virtual keyboard (as illustrated in FIG. 2). Moreover, the above-mentioned annular body 1 or telescopic portion 2 (or 2') may be further provided with a signal processing device 6, which is electrically connected to the laser sensor 5 and configured to determine an action operating the virtual keyboard according to a mapping relation between the location of the optical spot and the picture of keyboard. Of course, the signal processing device 6 may also be disposed outside the projection ring, and is configured to receive a signal of the laser sensor 5 on the projection ring in wireless or wired manner and then process the signal to determine the action operating the virtual keyboard. The laser generator 4 may be an infrared ray generator, for example, and the laser sensor 5 may be an infrared ray sensor; the infrared ray belongs to invisible light and hence causes no damage to the picture of virtual keyboard.

In an example, the above-mentioned projection ring further comprises a wireless module 7 electrically connected to the projector 3, as illustrated in FIG. 10. For example, the wireless module 7 is disposed on the annular body 1 of the projection ring; the projector is communicated to external devices by utilizing wireless technology. For example, an image displayed on a screen of a mobile phone can be output to and displayed on a palm. The wireless module 7 may further connect to the above-mentioned laser generator 4 and laser sensor 5, for example, to achieve both image output and keyboard input of a mobile phone on a palm. Of course, the projector may also be communicated to external devices by utilizing wired technology.

The projection ring according to the embodiments above allows conveniently adjusting the size of the picture as projected or the projection angle so as to improve display effect by adjusting the location of the projector through arranging the telescopic portion. Furthermore, it has no need of changing the location of the projection ring wearing on the finger, which ensures the wearing comfort level. Moreover, incorporating a laser generator and a laser sensor into the projection ring achieves a projection of a virtual keyboard so as to realize both image output and keyboard input. In addition, the projection ring is conveniently applicable in a better way by communicate to external devices through a wireless module.

What is described above is related to the illustrative embodiments of the disclosure only and not limitative to the scope of the disclosure; the scopes of the disclosure are defined by the accompanying claims.

The present application claims the priority of Chinese patent application No. 201420213546.0 filed on Apr. 28, 2014, the disclosure of which is incorporated herein by reference in its entirety.

What is claimed is:

1. A projection ring, comprising:
 an annular body;
 a telescopic portion disposed on the annular body; and
 a projector disposed on the telescopic portion,
 wherein the telescopic portion comprises a roller, a roller box, and a strip-shaped supporting belt, and wherein:
  the roller is disposed within the roller box, and
  the roller box is provided with an opening thereon, and the supporting belt has one end fixedly connected to the roller and another end provided with the projector thereon.

2. The projection ring of claim 1, wherein a telescopic direction of the telescopic portion is a central axial direction of the annular body.

3. The projection ring of claim 2, wherein the projector is rotatably connected to the telescopic portion.

4. The projection ring of claim 2, wherein the telescopic portion is rotatably connected to the annular body.

5. The projection ring of claim 1, wherein the projector is rotatably connected to the telescopic portion.

6. The projection ring of claim 5, wherein the telescopic portion is rotatably connected to the annular body.

7. The projection ring of claim 1, wherein the telescopic portion is rotatably connected to the annular body.

8. The projection ring of claim 1, wherein the telescopic portion comprises a telescopic arm and a telescopic head, and the projector is disposed on the telescopic head which is hinged to the telescopic arm.

9. The projection ring of claim 1, wherein the telescopic portion comprises a plurality of thimbles which are movably nested one on top of another, wherein a first thimble is fixedly disposed on the annular body and a last thimble is provided with the projector thereon.

10. The projection ring of claim 1, wherein
 in a condition that the telescopic portion is in a draw-back state, the supporting belt is bent to wrap around the roller; and
 in a condition that the telescopic portion is in a stretch-out state, the end of the supporting belt that is provided with the projector penetrates through the opening of the roller box to allow the supporting belt extending as a straight bar.

11. The projection ring of claim 1, further comprising:
 a laser generator disposed on the annular body; and
 a laser sensor disposed on the annular body or on the telescopic portion.

12. The projection ring of claim 11, wherein the laser generator is an infrared ray generator, and the laser sensor is an infrared ray sensor.

13. The projection ring of claim 11, further comprising a signal processing device disposed on the annular body or on the telescopic portion,
 wherein the signal processing device is electrically connected to the laser sensor.

14. The projection ring of claim 1, further comprising a wireless module electrically connected to the projector.

* * * * *